United States Patent
Westphal et al.

(10) Patent No.: US 6,250,877 B1
(45) Date of Patent: Jun. 26, 2001

(54) STEAM TURBINE CONTROLLER HAVING METHOD AND APPARATUS FOR PROVIDING VARIABLE FREQUENCY REGULATION

(75) Inventors: Bernd Artur Karl Westphal, Clifton Park; David Mark Stuebner, Delanson, both of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/619,539

(22) Filed: Jul. 19, 2000

(51) Int. Cl.[7] ............................................. F01B 25/00
(52) U.S. Cl. ........................... 415/17; 415/30; 415/36
(58) Field of Search .............................. 60/652; 415/13, 415/17, 30, 36

(56) References Cited

U.S. PATENT DOCUMENTS

| | | | |
|---|---|---|---|
| 3,698,829 | * 10/1972 | Kubo et al. .............................. | 415/36 |
| 3,703,339 | * 11/1972 | Czuszak .................................. | 415/36 |
| 4,118,935 | * 10/1978 | Andersson ......................... | 415/36 X |
| 4,545,782 | 10/1985 | Fitzmaurice . | |
| 4,581,889 | 4/1986 | Carpenter et al. . | |
| 4,993,221 | 2/1991 | Idelchik . | |
| 5,267,435 | 12/1993 | Frenkel et al. . | |
| 5,295,783 | * 3/1994 | Lesko et al. ........................ | 415/36 X |
| 5,609,465 | * 3/1997 | Batson et al. ....................... | 415/36 X |
| 5,761,895 | 6/1998 | Chu et al. . | |
| 6,070,405 | 6/2000 | Jerye et al. . | |

OTHER PUBLICATIONS

Modern Power Station Practice, "Turbines, Generators and Associated Plant", vol. 3, pp 125–146.

* cited by examiner

*Primary Examiner*—Hoang Nguyen
(74) *Attorney, Agent, or Firm*—Nixon & Vanderhye

(57) ABSTRACT

In a preferred embodiment, the invention relates to a steam turbine having a speed-loop droop governor with two load-frequency error gains (droops). The first gain (fast change) may be a conventional high gain that is used for power loads that have a constant frequency. When using only the first gain, the high rate of the first gain causes the droop governor to shut off steam to the turbine if the speed of the turbine drifts above a narrow speed range centered on the rated speed set-point. The second gain (slow change) is a low gain that causes the droop governor to tolerate a wide range of turbine speeds about the rated speed set-point.

15 Claims, 3 Drawing Sheets

STEAM TURBINE CONTROLLER HAVING METHOD AND APPARATUS FOR PROVIDING VARIABLE FREQUENCY REGULATION

BACKGROUND OF THE INVENTION

This invention relates to a control system for a turbine, and in particular, for a steam turbine. The invention specifically relates to a turbine speed controller that regulates the rotational speed and power output(load) of the turbine, especially during extended periods in which the turbine is required to operate at a frequency other than its normal frequency (speed) set-point.

Industrial and power steam turbines have control systems ("controllers") that monitor and control their operation. Traditionally, these controllers have included a speed/load controller (also referred to as a "droop governor") that maintains the turbine at a predetermined speed (the "speed set-point") prior to synchronization, provides over-speed control for the turbine, and load control when the unit is synchronized. The droop governor generates control signals that regulate the amount of steam flowing through the turbine. The regulation of the amount of steam controls the load when synchronized while the rotational speed of the turbine is in synchronization with the frequency of the electrical system grid.

The turbine is configured to operate at a certain rated speed set-point, which is selected to conform to the rated electrical system frequency. The droop governor reacts when the electrical system frequency deviates from the rated frequency by adjusting the steam inlet valves to adjust the speed of the turbine back to the rated speed set-point. If the turbine speed is substantially greater than its rated speed set-point, the droop governor will close the steam inlet valves.

Industrial and power generation steam turbines are commonly coupled to drive large generators that produce electricity. For example, large turbine-generator units produce electricity for power utilities that distribute electrical power through power grid networks to households, businesses and other power consumers. These electricity consumers generally require constant frequency electricity to power their electrical appliances (such as televisions and clocks); lighting systems; computer, telecommunications and information systems; factory equipment and other electrical systems. The electrical power grid networks usually operate at a predetermined constant power frequencies, such as 50 Hertz (Hz) or 60 Hz. To provide power for such a power grid, the turbine-generator units produce power at a constant frequency, e.g., 50 Hz, that matches the frequency of the grid ("load frequency"). The speed set-point of a steam turbine is selected to drive the generator to produce current at the frequency required by the load, e.g., 50 Hz.

Controllers for steam turbines are well known. An exemplary control system is the General Electric Speedtronic™ Mark V Turbine Control System. The SpeedtronicTM controller is a computer system that executes software programs to control the turbine using turbine sensor inputs and instructions from human operators. The commands generated by the controller cause valve actuators on the steam turbine to, for example, control and/or limit the power applied by the turbine to the generator; regulate inlet steam pressure to the turbine; limit inlet steam pressure to the turbine; control the extraction pressure from the turbine; regulate the steam admission control and steam bypass control; provide isochronous speed control, and initiate automatic transfer between operational modes.

Conventional steam turbine controllers perform several steam turbine control functions, including:

Ensuring that the rotational speed and acceleration of the turbine-generator units operate within acceptable limits, especially during start-up, and when (and if) the unit becomes disconnected from the load and would otherwise accelerate too rapidly.

Controlling the position of steam valves that allow steam into the turbine and allow steam to exhaust from the turbine. The steam valve positions control the power output and speed of the turbine. The controller executes signals entered from the operator or an automatic control system to regulate the steam passing through the turbine. In general, the operator sets a speed set-point for the turbine, and a droop governor maintains the speed of the turbine at (or near) that set-point when not synchronized. When the turbine is synchronized with a grid, the controller via its speed control function will help the electrical grid to maintain rated frequency.

Controlling the start-up of the turbine generator unit and its synchronization with a power grid. In particular, power grids operate at certain electrical power frequencies and voltage levels. The turbine generator units must be synchronized with these grid frequencies and voltage levels before they are coupled to the grid.

Providing pressure control of steam at the turbine inlet, at the steam extraction, and for other pressure control functions.

Unloading and securing of the turbine, such as when the turbine is disconnected from the electrical system grid and shut down.

Operating the turbine within certain limits, such as thermal and stress limits.

Providing protection against hazards, such as loss of oil pressure in turbine bearings and high vibration in bearings.

Testing of valves, such as steam inlet and outlet valves, and other vitally-important turbine functions.

Protective emergency overspeed shutdown (trip).

Conventionally, steam turbine controllers have a "speed-loop droop" controller (droop governor) that governs frequency regulation for the turbine-generator unit. The droop governor compensates for load frequency fluctuations and aids the grid in maintaining a relatively constant frequency (and hence rotational speed) of the turbine-generator unit. During a relatively large load rejection in the electrical grid the grid frequency will rise, and the steam turbine droop governor will proportionally close the steam inlet valves to reduce grid frequency to its rated value. As an example of using 5% frequency regulation, an increase of 1% of frequency over its rated value will lead to closing of the inlet steam control valves by 20%. At wide open inlet control valves and rated frequency, a 5% frequency or turbine speed increase will lead to fully closing of the inlet control valves.

Once synchronized with the grid, the rotational speed of the turbine-generator unit is determined by the frequency of the electrical power grid. The controller from the turbine maintains the speed set-point of the turbine at the rated speed-set point. This constant speed set-point for the turbine works well for most loads that have a constant "rated frequency", e.g., 60 Hz in the United States for utility power. The grid frequency typically does not vary and the turbine speed generally is at or near (e.g., within 0.5%) the rated speed set-point. If the load frequency changes, then the set-point is not a good match for the fluctuating load frequency.

If the load frequency does fluctuate and causes the turbine speed to drift, a conventional controller (droop governor) adjusts the valves to bring the turbine back to the set-point. Thus, a fluctuating frequency causes the controller and load to be in conflict. This conflict results in excessive valve operation and other unwanted variables in the operation of the turbine, such as turbine shutdown (if the turbine speed exceeds an over-speed condition, e.g., 105% of speed set-point). Accordingly, conventional turbine-generator units work well with constant frequency loads. They do not tolerate well fluctuations in the operating speed or frequency demands from the load, without moving control valves significantly.

Some electrical grid networks experience relatively-large frequency variations, e.g., plus or minus 5% off rated frequency, that extend over long periods of time, such as several hours. There are also loads on turbine-generator units that do experience relatively long duration, e.g., several hours or more, of operation at frequencies that are lower or higher than their rated frequency.

For example, countries experiencing rapid industrial development may have inadequate power generation utilities. In these countries, industrial power consumers have substantial power demands that vary during the day (as factories cycle through their day-to-day work schedule). During certain periods of a typical work-day, the industrial consumers demand more power than is readily available from the power grid, and cause the power frequency to drift below the rated frequency. During other periods of the day, the power generation utilities are providing more power than their customers require and the utilities allow the power frequency to drift above the rated frequency. Accordingly, the electricity consumers suffer electrical power grids that have relatively-large frequency variations over extended periods of time, such as several hours during high energy usage each day.

In applications where the load frequency fluctuates, the turbine-generator units must match the changing frequency of the load. In the electrical power grid systems with long-periods of frequency drifts, it may be required to maintain the turbine-generator units in operation while the frequency of the load varies by 5% or more from its rated frequency. Thus, the controller of the turbine-generator unit is required to adjust the operation of the unit so as to accommodate these variations in output power frequency.

In the past, compensation for relatively-large variations in load frequency, e.g., plus or minus 5% off rated frequency, has been accomplished by obtaining variances from normal over-speed trip set points, from bucket limitations and from other limitations. These past practices included widening the dead-band of the speed error filter. The dead-band filter causes the controller to ignore small changes in the turbine speed, such as ±0.5% from the speed set-point. Widening the dead-band filter to ±1.5%, for example, increases the range of fluctuations of the turbine speed for which no compensation is made by the droop governor. However, a wide dead-band filter can cause the droop governor to delay in reacting to fast accelerations in turbine speed such as after a load rejection. Because of the delay, a turbine that experiences a fast acceleration may exceed the overspeed trip setting.

Other prior approaches have involved adjusting the speed set-point of the turbine to match load frequency fluctuations. Repeatedly adjusting the speed set-point is potentially dangerous because it changes the over-speed control response. Other prior approaches have involved providing multiple-sloped characterization of the turbine frequency for use with the droop controller to prevent fast over-speed control response, and add correction of the load reference set-point based on differences between the actual and rated load frequency. These prior approaches have resulted in potentially excessive values of the speed reference and load reference set-points, also referred to as wind-up which leads to loss of over-speed control over ranges of over-frequency. Accordingly, there has been a long-felt need for a steam turbine control system which accommodates relatively-large variations off the rated frequency for the turbine-generator unit.

SUMMARY OF THE INVENTION

The present invention is a speed/load controller, e.g., droop governor, for a steam turbine that permits operation at 100% rated load, and permits the electrical system frequency set point to vary substantially, such as between 95% to 105% of the rated frequency or speed set-point. With the present invention, wind-ups (potentially dangerous loss of over-speed control over frequency ranges) of the turbine speed and load reference set-points are avoided. The droop governor accommodates slow variations in the load frequency and turbine speed changes, but reacts quickly when the frequency changes substantially and quickly.

In the present invention, the speed set point is used for acceleration and synchronization of the turbine-generator unit to the load. The load reference set point is used for setting the load set point to load the steam turbine generator after synchronization. In particular, the droop governor allows the steam valves to remain wide open (and allow for maximum passage of steam through the turbine) over a wide range of slow load frequency changes. The droop governor protects the steam turbine against excessive overspeed when sudden large frequency changes occur by quickly adjusting the valves at a high gain to reduce the flow of steam through the turbine.

In a preferred embodiment, the invention relates to a speed-loop droop governor having two frequency error gains (droops). The first gain (fast change) may be a conventional high gain that is used for loads that have a constant frequency at rated value. When only using the first gain (which is a conventional droop governor setting), the high rate of the first gain causes the droop governor to change steam flow to the turbine if the speed of the turbine drifts away from the rated speed set-point. The second gain (slow change) is a low gain that causes the droop governor to tolerate a wide range of turbine speeds about the rated speed set-point.

The operator of the turbine selects whether the first or second gain is to be used by the droop governor. The second gain is primarily intended to allow the turbine-generator unit to operate off the speed set-point and thereby match the frequency of the load, especially when the load slowly drifts from its rated frequency. When the second gain is selected, the droop governor continues to use the first gain (high gain) to react to quick changes in the load frequency and to ensure that the turbine does not accelerate too quickly. Thus, the droop governor ramps between the two gains in using the low gain (second) for slow frequency-speed changes and a large gain (first) for sudden large frequency changes to the load imposed by the electrical system. In addition, the droop governor provides over-speed control in case of load rejections, such as when there is a loss of load on the turbine-generator unit.

SUMMARY OF THE DRAWINGS

A preferred mode of the present invention is disclosed in the accompanying drawings, which are.

DETAILED DESCRIPTION OF THE INVENTION

Figure 1:
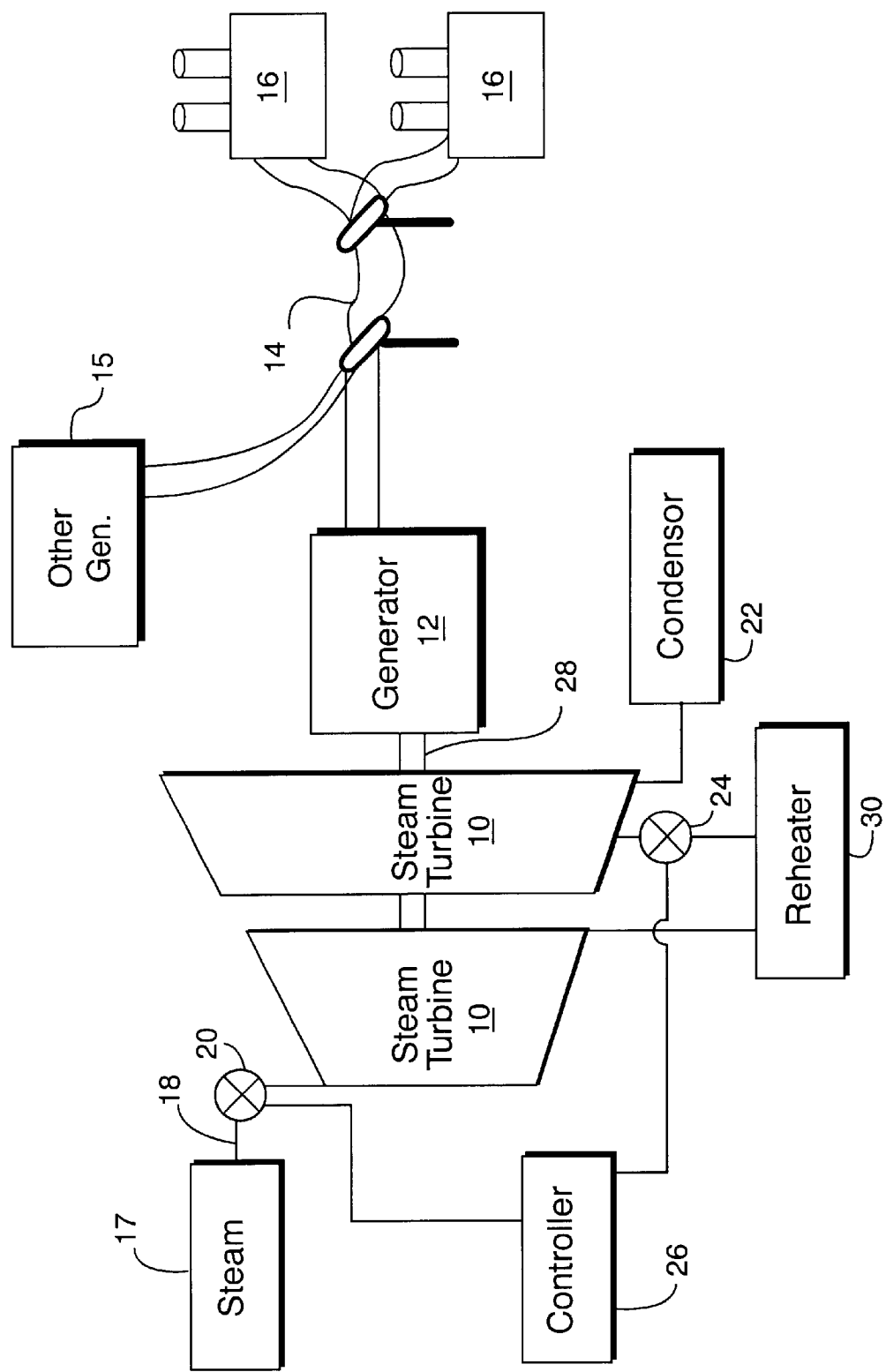
FIG. 1 is a schematic diagram of a steam-turbine unit coupled to a power grid network.

FIG. 1 is a schematic diagram of a two-section steam turbine 10 and generator 12 unit that is electrically coupled to a electrical power grid network 14. The network distributes power generated by the turbine-unit and other generator units 15 to power consumers 16. The turbine includes a source of steam 17, such as a boiler, a steam inlet conduit 18 and a steam inlet valve 20. The steam exhausts to a condenser 22. Moreover, there may be other parts to the turbine and the boiler, such as a steam reheater 30 and turbine intercept valves 24, that are operated by the controller.

A steam turbine controller 26 operates the inlet valve 20 by adjusting the position of the valve from an open position (which allows steam to pass through the valve) to a closed position (which blocks the passage of steam), and to all positions between full closure and full open. By adjusting the position of the inlet valve the amount of steam passing through the turbine is controlled, which in turn regulates the rotational speed of the turbine and its output shaft 28.

Figure 2:
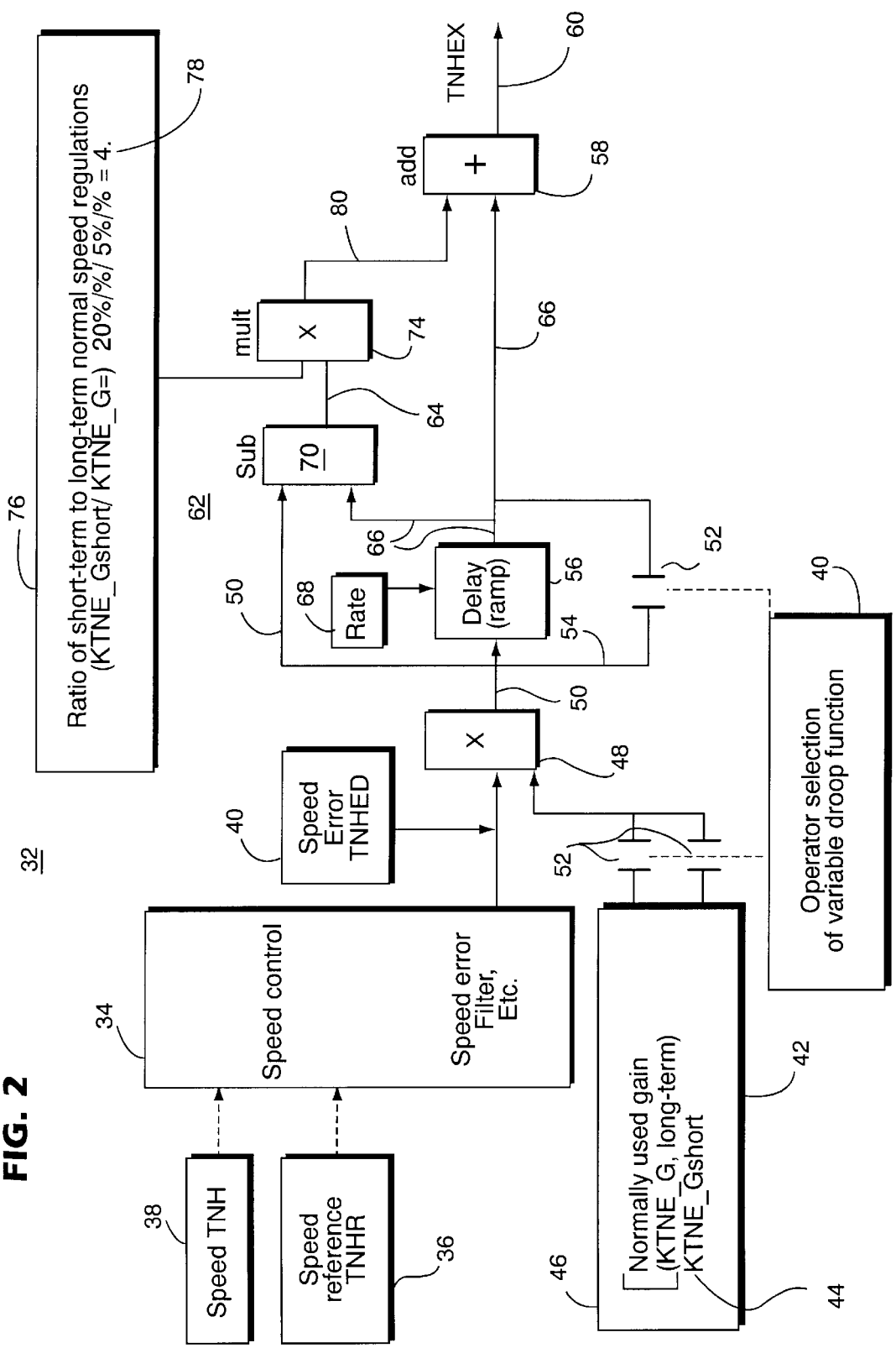
FIGS. 2 and 3 are a schematic and block diagram of a turbine control system in accordance with a preferred embodiment of the invention.

FIG. 2 is a schematic and block diagram of a speed controller 32 for a steam turbine controller, such as the General Electric (GE) Mark V Steam Turbine Controller. The functions of the controller are described in terms of a functional logic units and circuits, which can be implemented as hard-wired circuits, software and/or firmware. The controller 32 is a portion of an entire steam turbine controller 26. The other portions of the turbine controller are conventional and are well known.

The speed control logic unit 34 compares a speed reference set-point signal 36 (TNHR) with the actual rotational speed 38 (TNH) of the turbine. The speed set-point is selected for the turbine based on the load frequency ("rated frequency") applied to the turbine-generator unit and the operating limits of the unit. Moreover, the set-point is generally held constant during normal operations of the turbine-generator unit, even if the frequency demands of the load drift from the rated frequency. Accordingly, it is not necessary to adjust the set-point to match load frequency variations, even where such variations range from 105% to 95% of the rated frequency of the load.

The speed control logic unit 34 filters out minor fluctuations in the frequency of the load, such as due to jitter, low-amplitude load variations, and other short-term conditions that should be ignored by the speed controller. The difference between the actual speed TNH and the speed reference TNHR is converted by the speed controller 34 into a filtered speed error signal 40 (TNHED). The speed error signal 40 is generated by the speed control logic unit.

A selectable gain 42 is applied to the speed error signal 40 (TNHED). The gain is selectable by the operator of the turbine. The gain may be a conventional gain 44 used for loads that operate at (or near) a rated frequency and do not experience extended frequency shifts. This conventional gain may, for example, impose a 5% speed regulation (where regulation is the inverse of gain) that fully closes the steam input valves (and hence shuts down the turbine) if the speed of the turbine exceeds 105% of rated speed. With 5% speed regulation, the controller will reduce the steam input valve opening position by 20% for each 1% increase in the turbine speed. A second (slow change) gain 46 may be selected that is more tolerant of load frequency variations. An exemplary second gain provides 20% speed regulation that fully closes the steam input valves (and hence shuts down the turbine) if the speed of the turbine exceeds 120% of rated speed. With 20% speed regulation, the controller 32 reduces the steam input valve opening position by 5%, for each 1% increase in turbine speed. Accordingly, if the frequency of a load drifts such that the turbine speed 38 increases to 105% of the turbine rated speed 36, then the turbine will continue to operate at that speed, if the controller is operating with 20% speed regulation 46. In contrast, a speed increase of 105% would cause the controller to shut down the turbine, if only the 5% speed regulation 44 were being used.

As shown in FIG. 2, the controller 32 includes an operator selection 41 of a variable droop function, where the droop gains are a 5% speed regulation gain (KTNE_G) (46) and a 20% speed regulation gain (KTNE_GSHORT) (44). These gains are exemplary and may differ, such is in number of selectable gains and their rate, with different embodiments of this invention. Moreover the gain (e.g., 20% or 5%), may be adjustable by the operator or turbine manufacturer may set these rates. In addition, the 5% speed regulation gain is a "long-term" rate, in that it is applied by the controller (when selected) to compensate for slow changes (e.g., long-term) to the frequency of the load and hence the turbine speed. The 5% speed regulation (when the 20% gain is selected) is also used to compensate the turbine speed for quick frequency and speed changes. If the turbine begins to quickly accelerate (such as might occur if the load is rejected or otherwise disconnected from the turbine), then the controller applies the 5% speed regulation to rapidly close the steam inlet valves and avoid having the turbine trip on overspeed.

The selected speed regulation rate is applied to a gain unit 48, e.g., linear multiplier. The gain unit 48 adjusts the speed error signal 40 (TNHED) in proportion to the selected speed regulation gain rate 42. The gain unit 42 generates an uncorrected speed*gain signal 50. This uncorrected speed*gain signal is further processed depending on the speed regulation rate (44 or 46) that has been selected by the operator. In particular, if a short-term rate is selected, e.g., 5% speed regulation, then a gain selection switch 52 in the controller routes the uncorrected speed*gain signal 50 via line 54, around a delay unit 56 and through a summation logic unit 58, and out as the corrected speed*gain signal (TNHEX) 60. When the normal speed regulation rate 46 is selected (which will occur when the load does not experience substantial frequency fluctuations), no correction is needed to the uncorrected speed-gain signal, because that signal is already sufficiently responsive to compensate for quick accelerations of the turbine. Accordingly, the summation unit 58 does not adjust the uncorrected speed*gain signal 50. The summation unit may be disabled, e.g., turned OFF, when a normal (fast change) gain is selected.

If the long-term speed gain rate 46, e.g., 5%, is selected, then the resulting uncorrected speed*gain signal 50 is further adjusted to compensate for quick accelerations of the turbine speed. Indeed, for any speed regulation rate that is insufficient to compensate for quick turbine speed accelerations, a correction may be useful so that the uncorrected speed*gain signal can be adjusted to properly compensate for quick accelerations of the turbine. When a long-term speed regulation rate 46 is selected, the gain switch 52 is opened so as to break delay unit by-pass line 54, and to activate the ramp (delay) unit 56 and associated turbine acceleration compensation unit 62.

To correct the uncorrected speed*gain signal 50 and compensate for fast turbine accelerations, a rate of speed change signal 64 is generated and applied to adjust the speed*gain signal. The uncorrected speed*gain signal 50 is applied to the ramp unit 56 that generates a ramped speed*gain signal 66. The ramp function unit 56 applies a constant rate of change 68 to the speed*gain signal 50 until its output 66 reaches the same value as its input 50. For example, sudden and large change in the uncorrected speed*gain signal 50 (which is indicative of a partial load rejection or a sudden addition of a large load) will be delayed by the ramp function in proportion to the constant rate of change (K) 68. In contrast, a slowly changing speed*gain signal 50 will not be substantially delayed. The ramp of the ramp unit 56 has a slope corresponding to a rate (K) 68 that is selected by the turbine manufacturer or the power plant engineer. This rate 68 is a ratio of a unit time per unit speed reference signal, such as a 5 seconds for each 1% of the uncorrected speed*gain signal 50. If the rate (K=⅕) is 5 seconds per 1% speed*gain signal, then a 10% step change in speed*gain signal (which corresponds to a 2% step change in speed error signal (TNHED) and a 5% gain) will be delayed by 50 seconds (10%*⅕) until output from the ramp unit 56 as the delayed speed error signal 66. But if this 10% change in speed*gain signal 50 occurs gradually over a duration of 50 seconds, then no substantial time delay will occur, and signals 50 and 66 will have the same value and signal 64 will be equal to zero. A 10% step change of the uncorrected speed*gain signal 50 leads to a 10% difference between the uncorrected speed*gain signal input to the ramp unit and the ramped (output) speed*gain signal. This difference between the speed*gain signal 50 and the delayed speed*gain signal 66 is determined by a difference logic unit 70 that generates a difference signal 64 (which is representative of a rate of change of the turbine speed and the acceleration/deceleration of the turbine) that is input to a second gain logic unit 74. The difference in the current and delayed signals is representative of the rate of change (e.g., acceleration) of the turbine speed.

A large difference signal 64 suggests that a strong response is needed by the droop governor 32 to support the change in grid frequency. The fast change gain 44 causes the turbine governor to react more quickly to correct frequency. The slow change gain 46 would not trigger the governor to react strongly to avoid an over-speed condition.

An acceleration gain 76 is applied to the difference signal corresponding to the short-term (or normally used) speed regulation gain, e.g., 5% rate. That is, the difference signal 64 is based on speed*gain signals which already reflect the short term gain 46. Thus, the gain to be applied to the difference signal 64 must be proportional to the ratio of the short term speed regulation rate and the long term speed regulation rate. This ratio 78 is determined in a logic unit 76 that determines the ratio of the short-term and long-term speed gain rates, e.g. 20% divided by 5% equals a ratio of four (4). The ratio is applied as a gain rate 78 in the second gain unit 74 that multiplies the ratio with the current vs. delayed speed*gain difference signal 64, and generates a speed*gain correction signal 80.

The speed*gain correction signal 80 is summed with the uncorrected speed*gain signal in the summation unit 58. The speed*gain correction signal may be larger than the uncorrected speed*gain signal, especially when the turbine speed is accelerating fast. Indeed, when a turbine is quickly accelerating, the speed*gain correction signal 80 is intended to override the uncorrected speed*gain signal 66 so as to cause the droop governor 32 to rapidly close the steam inlet valves, and thereby prevent the turbine from over-speeding.

Figure 3:
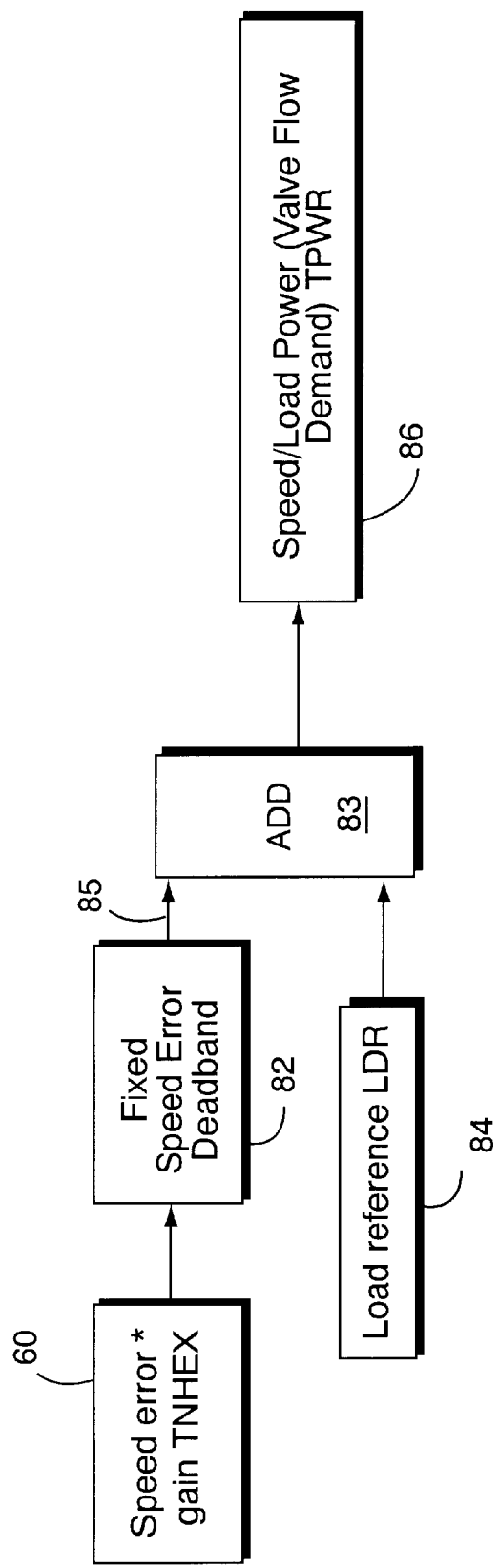

The output of the summation unit 60 is a corrected speed*gain signal (TNHEX). As shown in FIG. 3, the corrected speed*gain signal (TNHEX) may be further processed by, for example, a "fixed speed error deadband" logic unit 82, which establishes a deadband around rated frequency, and that filters out small speed*gain signals and generates a filtered corrected speed*gain signal 85. For example, the deadband logic unit may filter out speed*gain signals that are below a threshold level, such as below a speed error signal within 0.5% of the rated speed-set point. This deadband filter may, alternatively, be incorporated in the speed control unit 34 and applied directly to the speed error signal (TNHED).

The corrected speed*gain signal, after being processed by the deadband filter, is summed (added or subtracted) in summation unit 83 with a load reference signal 84. The load reference signal (also referred to as the load set-point) is used by the turbine operator to adjust the turbine load.

The summation unit 83 generates a combined turbine speed (based on the corrected speed*gain signal) and power control (based on the load reference signal) signal 86 (TPWR). In addition, there are other functions, such as limiting signals, entering the summation unit 83. This signal 86 is applied by the controller to adjust the steam valve settings that regulate the flow of steam through the turbine. For example, by reducing the opening of the input valve 20 the amount of steam entering the turbine is reduced and the turbine-generator will produce less power.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for controlling a steam turbine having a steam valve, the method comprising the steps of:
   a. generating a difference signal indicative of a difference between an actual rotational speed of the turbine and a turbine speed reference;
   b. applying a first gain to the difference signal to generate an uncorrected speed-gain signal;
   c. generating an acceleration signal indicative of a change in the turbine speed;
   d. applying a second gain to the acceleration signal to generate a speed-gain correction signal;
   e. applying the uncorrected speed-gain signal using speed-gain correction signal to generate a corrected speed-gain signal, and
   f. adjusting the steam valve using the corrected speed-gain signal.

2. A method for controlling a steam turbine as in claim 1 wherein the first gain is a lower gain than is the second gain, and the first and second gains each represent a ratio of a degree of adjustment of the steam valve with respect to a change in turbine speed.

3. A method for controlling a steam turbine as in claim 1 wherein the first gain represents a ratio of a 20% closure of the steam valve for each 1% increase in turbine speed, and wherein the second gain represents a ratio of a 5% closure of the steam valve for each 1% increase in turbine speed.

4. A method for controlling a steam turbine as in claim 1 wherein the acceleration signal is generated by comparing the uncorrected speed*gain signal in proportion to a linear constant to a ramped uncorrected speed*gain signal.

5. A method for controlling a steam turbine as in claim 4 wherein the method further comprises ramping the uncorrected speed*gain signal in proportion to a linear constant.

6. A method for controlling a steam turbine as in claim 1 wherein the application of the second gain to the acceleration signal is based on a function of the uncorrected speed*gain signal, and a ratio of the second gain and the first gain.

7. A method for controlling a steam turbine as in claim 1 wherein the step of generating includes combining the corrected*speed gain signal with a load reference.

8. A method for controlling a steam turbine having an inlet steam valve, the method comprising the steps of:
   a. generating a difference signal indicative of a difference between an actual rotational speed of the turbine and a turbine speed reference;
   b. applying a slow-change gain (to the difference signal to generate an uncorrected speed-gain signal;
   c. generating a rate of turbine speed change signal indicative of a rate of change of the turbine speed;
   d. applying a fast-change gain to the turbine speed change signal to generate a speed-gain correction signal;
   e. summing the uncorrected speed-gain signal with the speed-gain correction signal to generate a corrected speed*gain signal;
   f. filtering a predetermined narrow range of small range turbine speed variations to generate a filtered corrected speed*gain signal;
   g. combining the filtered corrected speed-gain signal and a load reference to generate a speed and load valve adjustment signal, and
   h. adjusting the inlet steam valve based on the speed and load control adjustment signal.

9. A controller for a steam turbine having an inlet steam valve comprising:
   a. a speed control logic unit outputting a difference signal indicative of a difference between an input actual rotational speed of the turbine and an input turbine speed reference;
   b. a first gain logic unit applying a first gain to the difference signal and outputting an uncorrected speed-gain signal;
   c. a difference logic unit outputting an turbine acceleration signal;
   d. a second gain logic unit having as inputs a second gain and the acceleration signal, and an output of a speed-gain correction signal;
   e. a summation logic unit having as an input the uncorrected speed-gain signal and an input the speed-gain correction signal, and an output of a corrected speed-gain signal, and
   f. a logic unit having an output of a valve adjustment signal and an input of the corrected speed-gain signal.

10. A controller for a steam turbine as in claim 9 wherein the first gain is a lower gain than is the second gain, and the first and second gains each represent a ratio of a degree of adjustment of the inlet steam valve for a change in turbine speed.

11. A controller for a steam turbine as in claim 9 wherein the first gain represents a ratio of a 20% closure of a steam valve for each 1% increase in turbine speed, and wherein the second gain represents a ratio of a 5% closure of the steam valve for each 1% increase in turbine speed.

12. A controller for a steam turbine as in claim 9 wherein the acceleration signal is generated by a comparison unit comparing the uncorrected speed*gain signal to a ramped uncorrected speed*gain signal.

13. A controller for a steam turbine as in claim 9 further comprising a ramp unit having an input of the uncorrected speed*gain signal, and input ramp rate applied to the uncorrected speed*gain signal, and an output ramped speed*gain signal.

14. A controller for a steam turbine as in claim 9 wherein the second logic unit applies a ratio of the second gain and first gain to the uncorrected speed*gain signal.

15. A controller for a steam turbine as in claim 9 further comprising a summation unit having inputs of the corrected*speed gain signal and a load reference signal, and generating a speed and load valve adjustment signal.

* * * * *